United States Patent

[11] 3,568,931

[72] Inventors James Oswald Mortlock
 Derby;
 Francis Jeffrey Colville, Sutton-in-Ashfield;
 James Millward, Nuthall, England
[21] Appl. No. 856,426
[22] Filed Sept. 9, 1969
[45] Patented Mar. 9, 1971
[73] Assignee Rolls-Royce Limited
 Derby, England
[32] Priority Sept. 11, 1968
[33] Great Britain
[31] 43257/68

[54] THRUST REVERSER
 11 Claims, 7 Drawing Figs.
[52] U.S. Cl. .................................................. 239/265.31,
 239/265.29
[51] Int. Cl. ...................................................... B64c 15/04
[50] Field of Search ........................................... 239/265.11,
 265.19, 265.25, 265.27, 265.29, 265.31,
 265.33, 265.39, 265.41; 60/228, 230, 232; 181/33
 (HA)

[56] References Cited
 UNITED STATES PATENTS
2,788,635 4/1957 Ford ............................ 239/265.19
3,380,662 4/1968 Miller .......................... 239/265.37
3,511,055 5/1970 Timms ......................... 239/265.29X Primary Examiner—M. Henson Wood, Jr
Assistant Examiner—Edwin D. Grant
Attorney—Cushman, Darby & Cushman ABSTRACT: A thrust reverser comprises a cylindrical casing having an apertured portion; a plurality of thrust reverser members which are mounted within the casing and are movable between a thrust reversal position, in which they block the casing to fluid flow therethrough and force the fluid to pass out through the said apertured portion, and a forward thrust position in which they permit the fluid to flow through the casing but block a part only of the apertured portion; a plurality of additional members which are disposed within the casing and are movable between a forward thrust position, in which they block at least most of the remaining part of the apertured portion, and a thrust reversal position, in which they permit the fluid to pass out through the apertured portion; a sleeve member which is movable over the casing between forward thrust and thrust reversal positions in which the apertured portion is respectively closed and opened to fluid flow therethrough; interconnecting means which interconnect the thrust reverser members, the additional members and the sleeve member so that the movement of all these members between their thrust reversal and forward thrust positions occurs simultaneously; and power-operated means for effecting the movement of the said members.

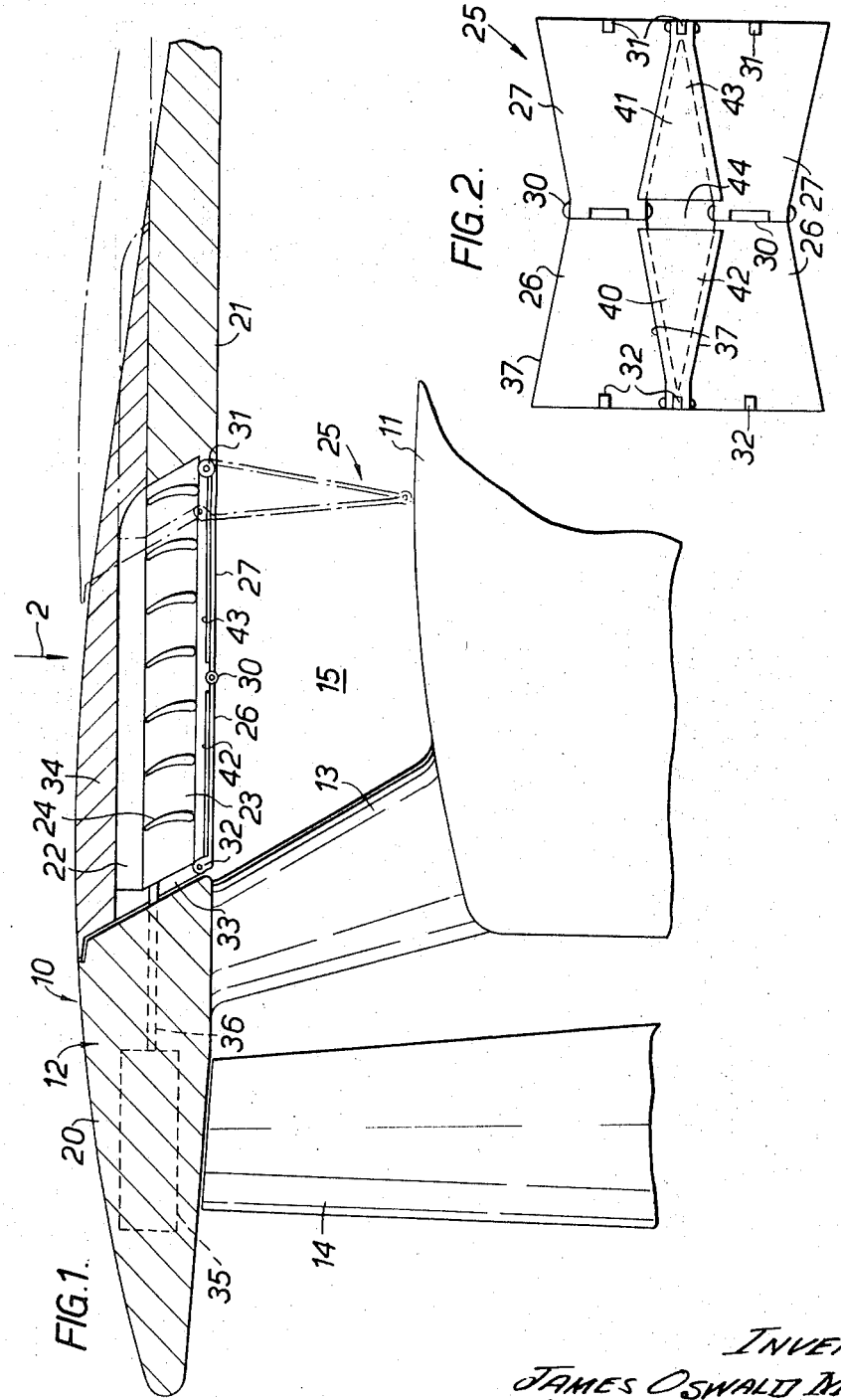

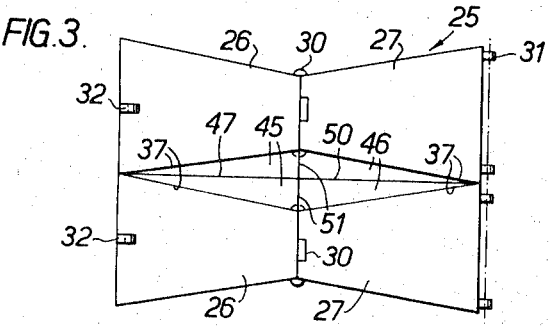
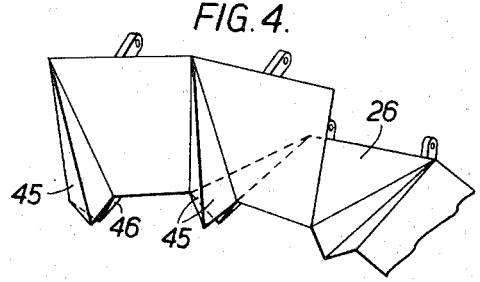
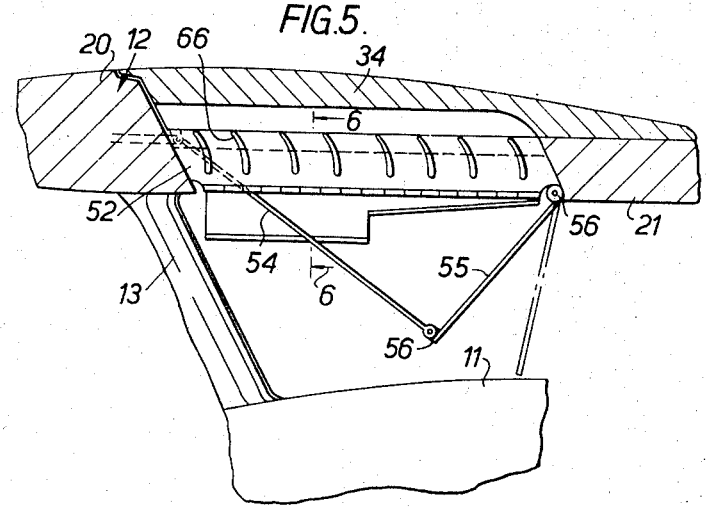

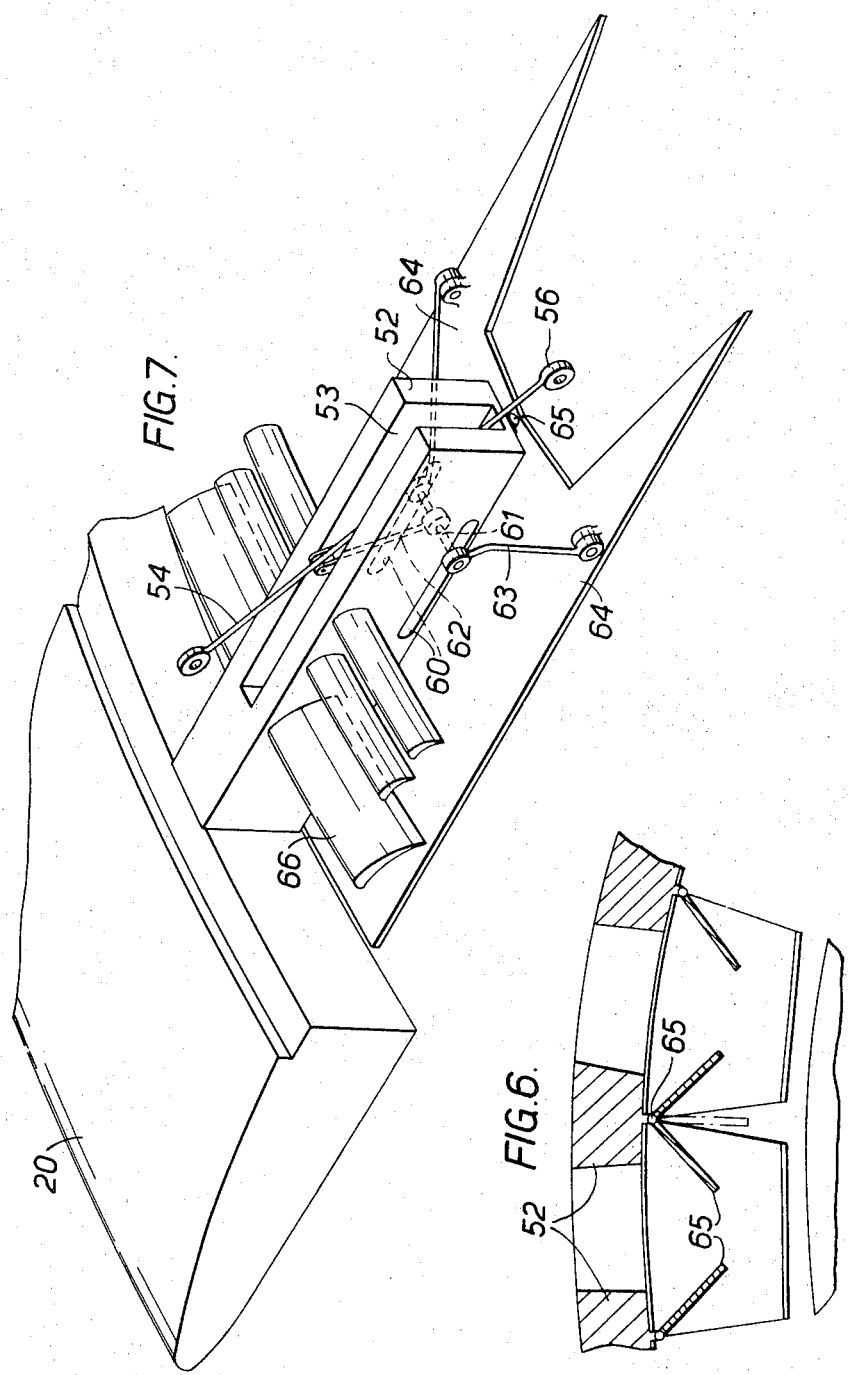

THRUST REVERSER

This invention concerns thrust reversers.

According to the present invention, there is provided a thrust reverser comprising a cylindrical casing having an apertured portion; a plurality of thrust reverser members which are mounted within the casing and are movable between a thrust reversal position, in which they block the casing to fluid flow therethrough and force the fluid to pass out through the said apertured portion, and a forward thrust position in which they permit the fluid to flow through the casing but block a part only of the apertured portion; a plurality of additional members which are disposed within the casing and are movable between a forward thrust position, in which they block at least most of the remaining part of the apertured portion, and a thrust reversal position, in which they permit the fluid to pass out through the apertured portion; a sleeve member which is movable over the casing between forward thrust and thrust reversal positions in which the apertured portion is respectively closed and opened to fluid flow therethrough; interconnecting means which interconnect the thrust reverser members, the additional members and the sleeve member so that the movement of all the members between their thrust reversal and forward thrust positions occurs simultaneously; and power operated means for effecting the movement of the said members.

The sleeve member is preferably movable axially of the casing. Moreover, the power-operated means is preferably connected to the sleeve member, the movement of the latter causing movement of the thrust reverser and additional members by way of the interconnecting means.

Each of the thrust reverser and additional members is preferably a flap member.

An assembly of guide vanes is preferably mounted in the apertured portion to direct the fluid forwardly when the said members are in the thrust reversal position.

The casing may have upstream and downstream portions which are disposed on opposite sides of the apertured portion and are interconnected by a plurality of angularly spaced apart, axially extending, beams which carry the said guide vanes, each of the thrust reverser members being interconnected to the sleeve member by a link which passes through a slot in a said beam or between adjacent beams.

Each additional member may be pivotally interconnected to at least one respective thrust reverser member.

Each thrust reverser member may have leading and trailing parts which are pivotally interconnected, the said leading and trailing parts being folded against each other in the thrust reversal position and being substantially coplanar in the forward thrust position.

Thus, in the forward thrust position, there may be gaps between the adjacent leading parts and gaps between the adjacent trailing parts of adjacent thrust reverser members, each additional member overlapping the said adjacent parts so as to cover most of the respective gap.

Alternatively, there may be a pair of pivotally interconnected additional members between the adjacent leading parts and the adjacent trailing parts of adjacent thrust reverser members.

The arrangement may be such that, in the forward thrust position, the thrust reverser members block the downstream part only of the apertured portion while the additional members block the upstream part only thereof.

The invention also comprises a gas turbine engine having a thrust reverser as set forth above. Thus, the engine may be a front fan engine, the thrust reverser being adapted to effect reversal of the fan air.

The invention is illustrated, merely by way of example, in the accompanying drawings, in which:

FIG. 1 is a broken-away sectional view of a gas turbine fan engine provided with a thrust reverser in accordance with the present invention;

FIG. 2 is a plan view of flap members forming part of the said thrust reverser, the view being taken in the direction of the arrow 2 of FIG. 1;

FIG. 3 is a view similar to FIG. 2, but illustrating a modification;

FIG. 4 is an extended view showing the flap members of FIG. 3 in a position intermediate their reversal and forward thrust positions;

FIG. 5 is a broken-away sectional view of part of a gas turbine fan engine provided with another trust reverser in accordance with the present invention;

FIG. 6 is a broken-away sectional view taken on the line 6—6 of FIG. 5; and

FIG. 7 is a diagrammatic perspective view showing part of the structure of FIG. 5, but with some portions thereof omitted in order to simplify the drawing.

Referring first to FIGS. 1 and 2 of the drawings, a gas turbine front fan engine 10 has an inner casing 11 within which there are mounted, in flow series, the compressor means, combustion equipment, and turbine means of the engine, none of which are shown in the drawings. The inner casing 11 is mounted concentrically within a cylindrical outer casing (or pod) 12 by means of a plurality of angularly spaced apart aerofoil-shaped struts 13. Mounted at the front of the engine 10 is a fan 14 which is driven from the main shaft (not shown) of the engine, the fan 14 directing fan air through an annular fan duct 15 which is defined between the casings 11, 12.

The outer casing 12 has an upstream portion 20 and a downstream portion 21 which are disposed on opposite sides of an apertured portion 22 and are interconnected by a plurality of angularly spaced apart axially extending beams 23. Mounted in the apertured portion 22 is an assembly of guide vanes 24 which are carried by the beams 23 and which, during reverse thrust, direct the fan air from the duct 15 forwardly.

Mounted within the outer casing 12 are a plurality of angularly spaced apart thrust reverser flap members 25. The thrust reverser members 25 are movable between a thrust reversal position, which is indicated in dotted lines in FIG. 1, and in which they block the fan duct 15 to flow therethrough and force the fan air to pass out through the apertured portion 22, and a forward thrust position, which is shown in full lines in FIG. 1, and in which they permit the fan air to flow through the fan duct 15 but block the major part (but not the whole) of the apertured portion 22.

As will be seen from FIG. 2, each of the thrust reverser flap members 25 has a leading part 26 and a trailing part 27 which are pivotally interconnected at a hinge 30. The trailing edge of each of the trailing parts 27 is mounted on pivots 31 carried by the downstream portion 21 of the outer casing 12. The leading edge of the leading part 26 of each of the thrust reverser flap members 25 is connected at pivots 32 to a link 33 which extends radially inwardly from a sleeve member 34, and which extends through a slot (not shown) in a respective beam 23 or, alternatively, passes between closely adjacent beams 23. The sleeve member 34 is movable axially of the outer casing 12 by means of hydraulic or pneumatic rams 35 (only one shown), the rams 35 being connected to the links 33, and hence to the sleeve member 34, by way of rods 36.

The rams 35 may be actuated to move the sleeve member 34 over the outer casing 12 between forward thrust and thrust reversal positions which are shown in FIG. 1 in full lines and dotted lines respectively, and in which, respectively, the apertured portion 22 is closed and opened to the flow therethrough of the fan air.

As will be seen from FIG. 2, each of the leading and trailing parts 26, 27 of the flap reverser thrust members 25 is trapezoidal in shape having sides 37 which converge towards the respective hinge 30. The arrangement is such that, in the forward thrust position, the parts 26, 27 are substantially coplanar, but that, in the thrust reversal position, the parts 26, 27 may be folded against each other in such a way that the edges 37 of adjacent thrust reversal flap members 25 abut each other. There are thus gaps 40 between the adjacent leading parts 26 of adjacent thrust reverser members 25 and gaps 41 between the adjacent trailing parts 27 of adjacent thrust reverser members 25. As will be appreciated, it is desirable to be able substantially to close these gaps 40, 41 in the forward thrust position in order to prevent pressure losses and turbulence in the fan duct 15.

In order to achieve this, a substantially triangular additional flap member, or fillet, 42 is mounted within the outer casing 12 and on a pivot 32 on which adjacent leading parts 26 are mounted, the additional flap member 42 overlapping the said adjacent parts 26 so as to cover most of the respective gap 40 in the forward thrust position.

Similarly, an additional flap member 43 is mounted within the outer casing 12 and on a pivot 31 on which two adjacent trailing parts 27 are mounted, in such a way as to overlap the trailing parts 27 so as to cover most of the respective gap 41 in the forward thrust position. The additional flap members 42, 43 are, of course, moved by the rams 35 in unison with the movement of the respective thrust reverser members 25.

When the parts are disposed in the forward thrust position, shown in full lines in FIG. 1, the sleeve member 34 is so disposed as to close the apertured portion 22 to flow therethrough of the fan air, the thrust reverser flap members 25 have their parts 26, 27 substantially coplanar and in a position such that they block a part only of the apertured portion 22, while the additional flap members 42, 43 block most of the remaining part of the apertured portion 22, leaving a small space 44 between axially aligned additional flap members 42, 43 in order to permit the required pivotal movement of the thrust reverser flap members 25 about their hinges 30. This gap 44 is, of course, shown in FIG. 2 in a somewhat exaggerated form.

When, however, it is desired to effect thrust reversal of the fan air, the rams 35 are actuated to move the sleeve member 34 axially downstream to the position shown in dotted lines in FIG. 1. When this occurs, the interconnection between the sleeve member 34 and the thrust reverser members 25 which is provided by the links 33, and the interconnection between the thrust reverser members 25 and the additional flap members 42, 43 which is provided at the hinges 31, 32, will ensure that the movement of the sleeve member 34 causes simultaneous movement of the thrust reverser flap members 25 and of the additional flap members 42, 43. In this thrust reversal position, the parts 26, 27 will be folded against each other with the additional flap members 42, 43 sandwiched therebetween. The thrust reverser flap members 25 will thus block the fan duct 15 and force the fan air out through the apertured portion 22, the guide vanes 24 directing this fan air forwardly. In this thrust reversal position, the additional flap members 42, 43 will of course be in a position such as not to hinder the flow of fan air out through the apertured portion 22.

In FIGS. 3 and 4, there is illustrated a modification of the construction which has been described above with reference to FIGS. 1 and 2. In the construction of FIGS. 3 and 4, the thrust reverser members 25 are formed and mounted in exactly the same way as in the construction of FIGS. 1 and 2. Instead, however, of providing the additional flap members 42, 43, a pair of additional flap members 45 are provided between the adjacent leading parts 26 of adjacent thrust members 25, while a pair of additional flap members 46 are provided between adjacent trailing parts 27 of adjacent thrust reverser members 25. Each of the additional flap members 45 is pivotally connected (by a "piano-wire" hinge) to its respective leading part 26 along the edge 37 of the latter, while each of the additional flap members 45 is also pivotally connected to the other additional flap members of the pair along their common edge 47. Similarly, each of the additional flap members 46 is pivotally connected to its respective trailing part 27 along the edge 37 of the latter, whilst each of the additional flap members 46 is pivotally connected to the other additional flap member of the pair along their common edge 50. The additional flap members 45 are not, however, connected to the flap members 46 even though they abut the latter at a common edge 51.

Thus in the course of folding the thrust reverser members 25 between the forward thrust and the thrust reversal positions, the parts assume the shape shown in FIG. 4 in which the additional flap members 45 are folded against each other so as to extend from the leading parts 26 in an upstream direction, while the additional flap members 46 are folded against each other so as to extend from the trailing parts 27 in a downstream direction.

Thus, in the embodiment of FIGS. 3 and 4, the additional flap members 45, 46, in the forward thrust position, block the whole of the apertured portion 22 which is left unblocked by the thrust reverser flap members 25.

In the embodiment of the invention shown in FIGS. 5 to 7, the upstream portion 20 of the casing 12 is interconnected to the downstream portion 21 thereof by a plurality of angularly spaced apart axially extending beams 52 having an axially extending slot 53 (FIG. 7) through each of them. The sleeve member 34 (which is not shown in FIG. 7 in order to simplify the drawing) is interconnected by links 54 to a plurality of angularly spaced apart flap reverser members 55 each of which is pivotally mounted in the downstream portion 21 of the casing 12 on a hinge 56, the links 54 passing through the slots 53. Thus, as the sleeve member 34 is moved axially by the rams, the links 54 will move axially through the slots 53 so as to cause pivotal movement of the thrust reverser flap members 55 between a thrust reversal position, which is shown in dotted lines in FIG. 5, and a forward thrust position in which the thrust reverser flap members 55 extend axially.

Each of the beams 52 is provided with slots 60 through which extends a pin 61 which is connected to the respective link 54 by an intermediate link 62. Each end of each pin 61 has an arm 63 which is pivotally connected thereto and is also pivotally connected to one of a pair of additional flap members 64 which are mounted on a common hinge 65 at the radially inner end of a respective beam 52. Thus, as the link 54 is moved axially through the slot 53, the flaps 64 are moved between a forward thrust position, in which they extend circumferentially and abut each other in the circumferential direction so as to block the upstream part of the apertured portion 22, and a thrust reversal position, in which they extend radially and lie alongside each other, so as not to hinder the flow of fan air out through the apertured portion 22.

Thus the arrangement of FIGS. 5 to 7 is such that, in the forward thrust position, the thrust reverser members 55 block the downstream part only of the apertured portion 22, while the additional flap members 64 block the upstream part only thereof.

In the construction of FIGS. 5 to 7, moreover, guide vanes 66 are employed which have a short cord so as to provide room for the slots 60. As will be appreciated a number of the guide vanes 66 has been omitted from FIG. 7 in order to simplify the drawing.

As will be appreciated, in all the embodiments of the invention the radial distance between the casings 11, 12 is very much smaller than the axial distance between the parts 20, 21 of the casing 12. Thus, for example, the latter dimension may be nearly three times as great as the former. The construction of the various flap members, however, is such as to cater for this difference in the two dimensions.

We claim:

1. A thrust reverser comprising a cylindrical casing having an apertured portion; a plurality of thrust reverser members which are mounted within the casing and are movable between a thrust reversal position, in which they block the casing to fluid flow therethrough and force the fluid to pass out through the said apertured portion, and a forward thrust position in which they permit the fluid to flow through the casing but block a part only of the apertured portion; a plurality of additional members which are disposed within the casing and are movable between a forward thrust position, in which they block at least one of the remaining part of the apertured portion, and a thrust reversal position, in which they permit the fluid to pass out through the apertured portion; a sleeve member which is movable over the casing between forward thrust and thrust reversal positions in which the apertured portion is respectively closed and opened to fluid flow therethrough; interconnecting means which interconnect the thrust reverser members, the additional members and the sleeve member so that the movement of all these members between their thrust reversal and forward thrust positions occurs simultaneously; and power operated means for effecting the movement of the said members.

2. A thrust reverser as claimed in claim 1 in which the sleeve member is movable axially of the casing.

3. A thrust reverser as claimed in claim 2 in which the power operated means is connected to the sleeve member, the movement of the latter causing movement of the thrust reverser and additional members by way of the interconnecting means.

4. A thrust reverser as claimed in claim 3 in which each of the thrust reverser and additional members is a flap member.

5. A thrust reverser as claimed in claim 4 in which an assembly of guide vanes is mounted in the apertured portion to direct the fluid forwardly when the said members are in the thrust reversal position.

6. A thrust reverser as claimed in claim 5 in which the casing has upstream and downstream portions which are disposed on opposite sides of the apertured portion and are interconnected by a plurality of angularly spaced apart axially extending beams which carry the said guide vanes, each of the thrust reverser members being interconnected to the sleeve members by a link which passes through a slot in a said beam or between adjacent beams.

7. A thrust reverser as claimed in claim 1 in which each additional member is pivotally interconnected to at least one respective thrust reverser member.

8. A thrust reverser as claimed in claim 7 in which each thrust reverser member has leading and trailing parts which are pivotally interconnected, the said leading and trailing parts being folded against each other in the thrust reversal position and being substantially coplanar in the forward thrust position.

9. A thrust reverser as claimed in claim 8 in which, in the forward thrust position, there are gaps between the adjacent leading parts and gaps between the adjacent trailing parts of adjacent thrust reverser members, each additional member overlapping the said adjacent parts so as to cover most of the respective gap.

10. A thrust reverser as claimed in claim 8 in which there are a pair of pivotally interconnected additional members between the adjacent leading parts and the adjacent trailing parts of adjacent thrust reverser members.

11. A thrust reverser as claimed in claim 1 in which, in the forward thrust position, the thrust reverser members block the downstream part only of the apertured portion, while the additional members block the upstream part only thereof.